(12) United States Patent
Lee

(10) Patent No.: US 8,780,044 B2
(45) Date of Patent: Jul. 15, 2014

(54) RETRACTABLE MOUSE STRUCTURE

(75) Inventor: Tsung-Shih Lee, New Taipei (TW)

(73) Assignee: Cheung Uei Precision Industry Co., Ltd., New Taipei (TW)

( * ) Notice: Subject to any disclaimer, the term of this patent is extended or adjusted under 35 U.S.C. 154(b) by 227 days.

(21) Appl. No.: 13/401,838

(22) Filed: Feb. 21, 2012

(65) Prior Publication Data

US 2013/0214657 A1  Aug. 22, 2013

(51) Int. Cl.
*G06F 3/033* (2013.01)

(52) U.S. Cl.
USPC ........................................... 345/163

(58) Field of Classification Search
CPC ............ G06F 3/033; G06F 2203/0332; G06F 2203/0333
USPC ......................................... 345/163, 164, 167
See application file for complete search history.

(56) References Cited

U.S. PATENT DOCUMENTS

| | | | | |
|---|---|---|---|---|
| 6,304,249 | B1* | 10/2001 | Derocher et al. | 345/163 |
| 7,737,946 | B2* | 6/2010 | Yen | 345/163 |
| 7,817,137 | B2* | 10/2010 | Wang | 345/163 |
| 2010/0007607 | A1* | 1/2010 | Li | 345/163 |

* cited by examiner

*Primary Examiner* — Chanh Nguyen
*Assistant Examiner* — Jonathan Blancha
(74) *Attorney, Agent, or Firm* — Cheng-Ju Chiang

(57) ABSTRACT

A mouse structure includes a housing and first and second sliding apparatuses. The housing has an accommodating portion and an opening The first sliding apparatus includes a base board and a sliding element, the base board being fixedly disposed in the accommodating portion, and the sliding element being slidably mounted on the base board. The second sliding apparatus is slidably disposed in the accommodating portion and includes a main body and a reacting portion connecting the main body, the main body being capable of sliding in and out of the accommodating portion from the opening. When the main body slides out of the opening, the sliding element is concurrently and separately pulled by the reacting portion to the first position, and when the main body slides into the accommodating portion, the sliding element is concurrently and separately pushed by the reacting portion to the second position.

10 Claims, 4 Drawing Sheets

RETRACTABLE MOUSE STRUCTURE

BACKGROUND OF THE INVENTION

1. Field of the Invention

The present invention relates to a mouse, and particularly to a mouse structure that is retractable, less space occupied when not in use, and easy to use.

2. Related Art

Types and shapes of mice are many and various. Whatever the type or shape of a conventional mouse has its own physical size which occupies a certain space whenever it is in use or not. Although a mouse can be designed as small size, they are merely suitable for users of smaller palms but not for most users. Hence a mouse is improved to have a retractable portion for being retractable into a casing of the mouse to reduce the size when not in use. However, no matter the retractable portion is being retracted in or pulled out of the mouse, it is required to apply a certain force during the whole process of retracting and pulling the retractable portion in place, and it is strength-consuming and rather inconvenient in use. Therefore, it is imperative to overcome the aforesaid drawbacks of the conventional mouse by improving it to be less-space occupied and easy use.

SUMMARY OF THE INVENTION

Accordingly, an object of the present invention is to provide a mouse structure, which has a retractable structure for reducing a physical size when not in use, and is easy to use.

To achieve the above-mentioned object, a mouse structure of the present invention comprising a housing having an accommodating portion formed therein, an opening defined on one end of the housing and communicating with the accommodating portion, and a bottom base disposed at a bottom of the housing opposite to the opening; a first sliding apparatus disposed in the accommodating portion, and comprising a base board and a sliding element, the base board fixedly disposed in the accommodating portion, and the sliding element being slidably mounted on the base board and movable between a first position and a second position; and a second sliding apparatus being slidably disposed in the accommodating portion, and comprising a main body and a reacting portion connecting the main body, the main body being capable of sliding in and out of the accommodating portion from the opening, and a reacting end being defined on one end of the reacting portion opposite to the main body.

With the above-mentioned structure, when the main body of the second sliding apparatus slides out of the opening, the sliding element of the first sliding apparatus is concurrently and separately pulled by the reacting portion to the first position, and when the main body slides into the accommodating portion, the sliding element is concurrently and separately pushed by the reacting portion to the second position, whereby the second sliding apparatus is retractable to the accommodating portion, and the mouse structure is easy to use.

DESCRIPTION OF THE PREFERRED EMBODIMENTS

Figure 1:
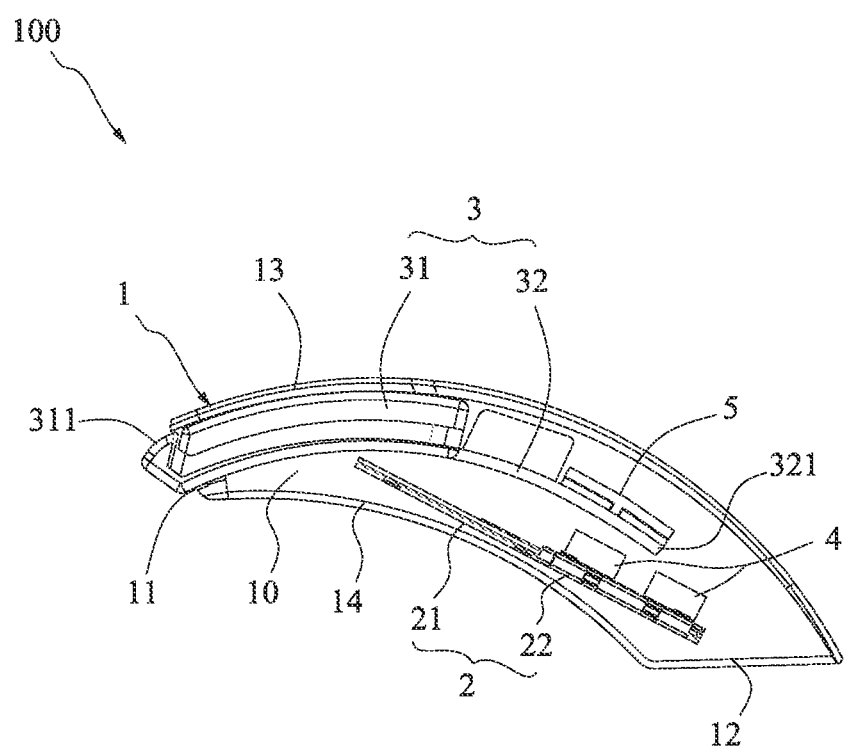
FIG. 1 is a schematic cutaway side view of a mouse structure of the present invention.
Figure 2:
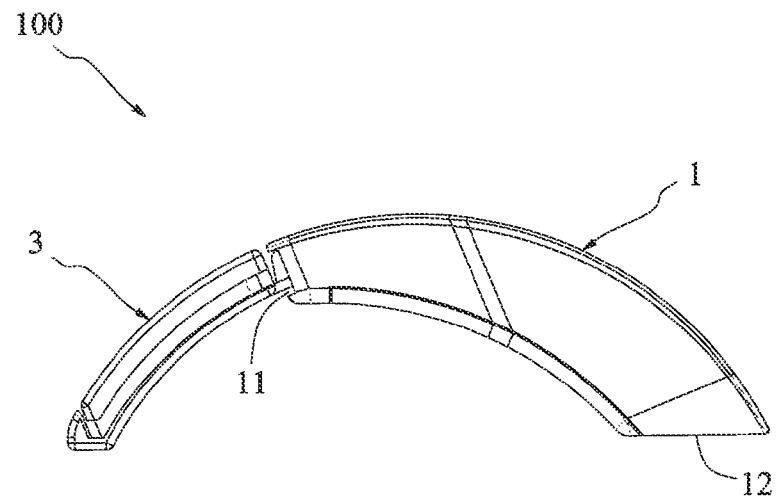
FIG. 2 is a right side elevation view of the mouse structure of the present invention.
Figure 3:
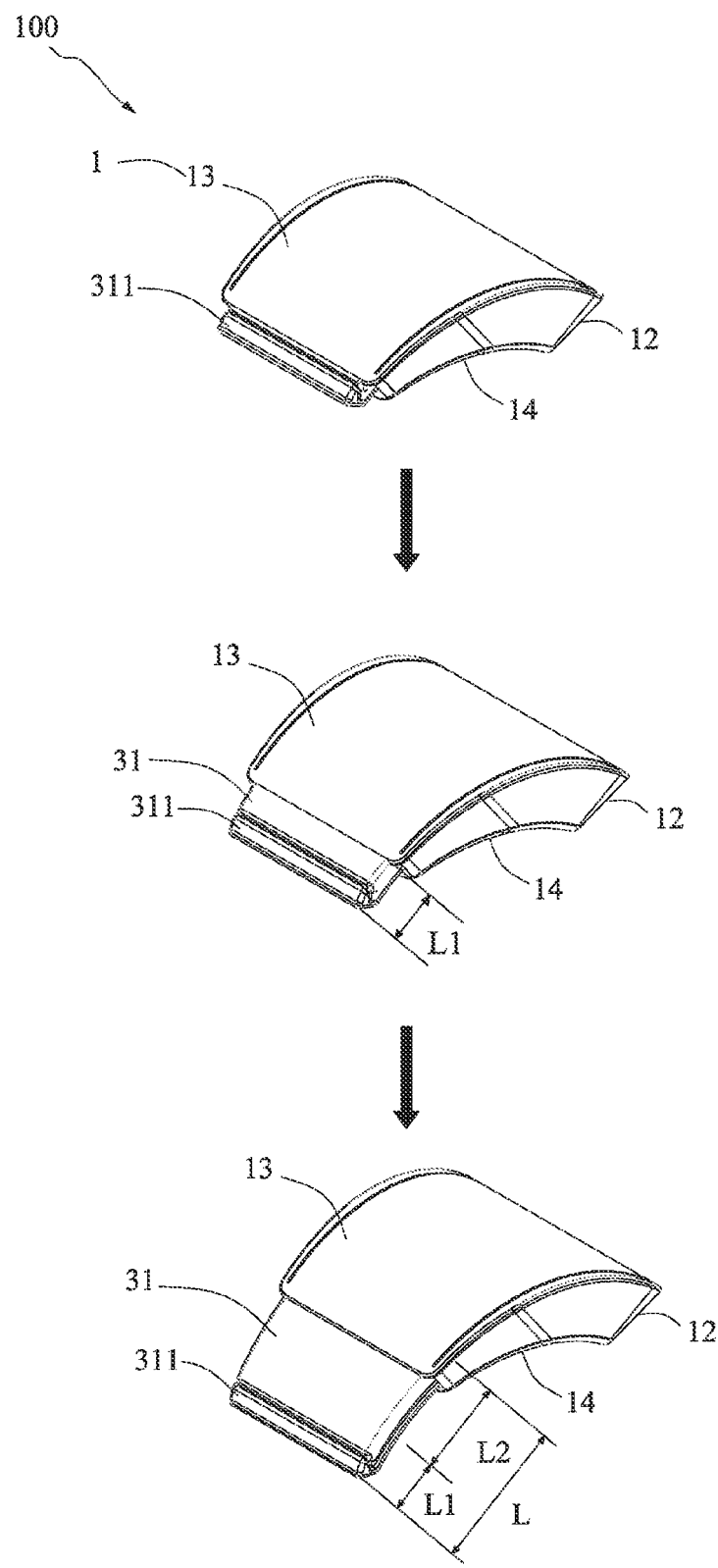
FIG. 3 is a schematic view showing processes of a second sliding apparatus of the mouse structure sliding a sliding distance.

Referring to FIG. 1 showing a preferable embodiment of the present invention. A mouse structure 100 of present invention comprises a housing 1, a first sliding apparatus 2, and a second sliding apparatus 3. The housing 1 has upper and lower walls 13, 14, an accommodating portion 10 formed in the housing 1 for accommodating the first and second sliding apparatuses 2, 3, an opening 11 is defined on one end of the housing 1 and communicating with the accommodating portion 10 and being substantially rectangle, a bottom base 12 is disposed at a bottom of the housing 1 opposite to the opening 11 and is substantially rectangle. The opening 11 and the bottom base 12 connect opposite ends of the upper and lower walls 13, 14, respectively. In this preferred embodiment, the housing 1 has an arc cross section, and a length of a short-axis of the bottom base 12 is larger than a length of a short-axis of the opening 11 (as shown in FIGS. 2 and 3). However, the shape of the housing 1 is not limited thereby.

Figure 4:
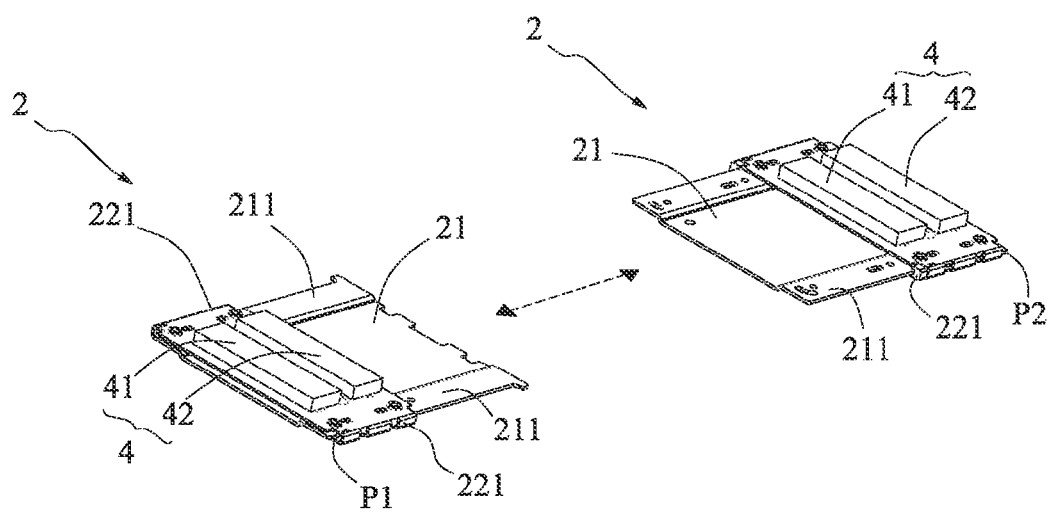
FIG. 4 is a schematic view showing processes of a sliding element of a first sliding apparatus of the mouse structure sliding between first and second positions.

Referring to FIG. 1 in combination with FIG. 4, the first sliding apparatus 2 comprises a base board 21 and a sliding element 22, wherein the base board 21 is fixedly disposed in the accommodating portion 10 and tilted at a certain angle with respect to the bottom base 12 and the opening 11, the base board 21 being flat and rectangle. The second sliding element 22 is slidably mounted on the base board 21 and movable between a first position P1 and a second position P2. The base board 21 is able to be provided with limiting elements (not shown) near the first and second positions P1 and P2 for further limiting an ultimate distance where the sliding element 22 moves on the base board 21. Furthermore, tracks 211 are protruded from opposite portions of the base board 21 from a front end to rear end of the base board 21, respectively. Opposite sides of the sliding element 22 respectively bend to form a sliding slot 221 of a U-shape. The sliding slot 221 is slidably mounted on the track 211. An upper surface of the base board 21 between the tracks 211 is lower than upper surfaces of the tracks 211 in order to reduce frictional contact with the sliding element 22 and facilitate moving of the sliding element 22.

Referring to FIGS. 1 to 3, the second sliding apparatus 3 is slidably disposed in the accommodating portion 10 and capable of sliding a sliding distance L to move in and out of the accommodating portion 10 from the opening 11. The sliding distance L includes a first sliding distance L1 and a second distance L2. The second sliding apparatus 3 comprises a main body 31 and a reacting portion 32 connecting the main body 31, wherein a reacting end 321 is defined on one end of the reacting portion 32 opposite to the main body 31. The main body 31 and the reacting portion 32 cooperatively form an arc cross section corresponding to the arc cross section of the housing 1. The main body 31 further has a pulling portion 311 formed on one end thereof opposite to the reacting portion 32 and always exposed to the opening 11 of the housing 1 for being pulled to move the second sliding apparatus 3.

Particularly, the reacting portion 32 of the second sliding apparatus 3 is spaced away from the sliding element 22, wherein the sliding element 22 is provided with a plurality of magnets 4 including a magnet 41 and a magnet 42 both disposed apart from each other on the sliding element 22, and the reacting portion 32 is provided with a magnet group 5 being disposed thereon and overlapped, the magnet group 5 includes multiple magnets. In this embodiment, the magnet group 5 of the reacting portion 32 is oriented in polar attraction to the plurality of magnets 4 of the sliding element 21. However, relationship of the magnet group 5 and the plurality of magnets 4 is not limited thereby.

Figure 5:
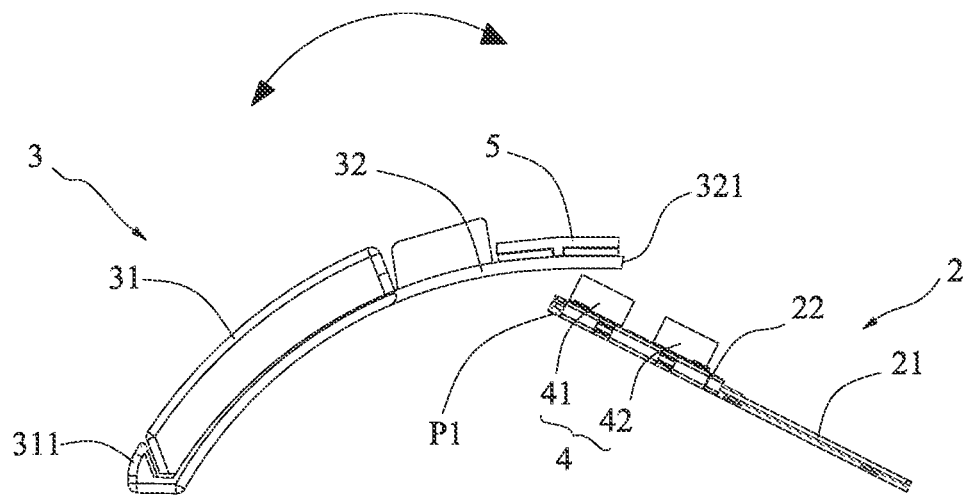
FIG. 5 is a schematic view showing the sliding element slides to the first position.
Figure 6:
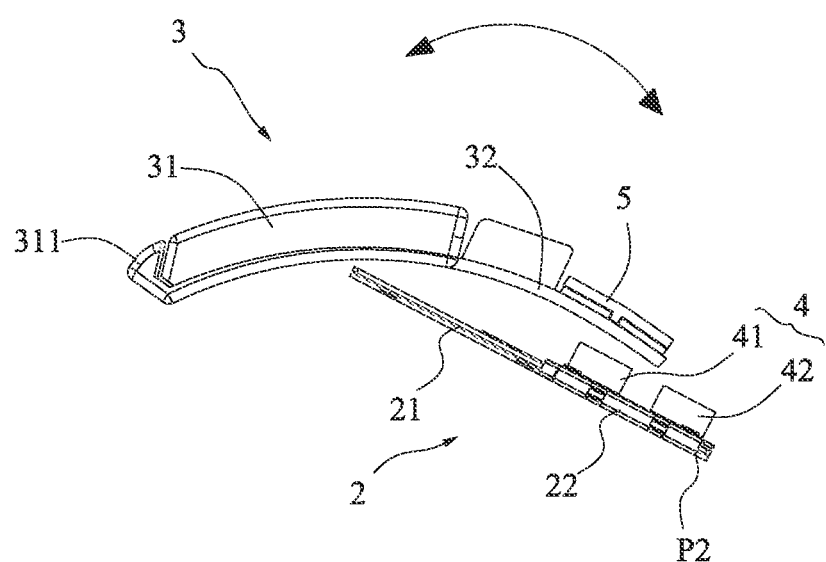
FIG. 6 is a schematic view showing the sliding element slides to the second position.

Referring to FIGS. 5 and 6, the mouse structure 1 of the present invention in use, the pulling portion 311 is being pulled with a pulling force to drive the main body 31 of the second sliding apparatus 3 moving out of the opening 11, and the magnets 4 of the sliding element 22 are concurrently and separately attracted by the magnet group 5 of the reacting portion 32, and therefore the sliding element 22 lineally slides accordingly. After sliding over the first distance L1, the main body 31 slides downwards automatically the second sliding distance L2 along a predetermined curve path with the pulling force and by taking advantage of the gravity. Meanwhile, the sliding element 22 lineally slides to the first position P1 on the base board 21, where the main body 31 is completely exposed to the opening 11, a bottom face of the pulling portion 311 is flush with the bottom base 12 on a same plane (as shown in FIG. 2), and the reacting end 321 is substantially located above a middle of the magnet 41 of the sliding element 22 adjacent to the first position P1. Likewise, when the main body 31 is being pushed to slide into the accommodating portion 10, the magnets 4 of the sliding element 22 are concurrently and separately attracted by the magnet group 5 of the reacting portion 32, and therefore the sliding element 22 slides downwards to the second position P2 where the reacting end 321 of the reacting portion 32 is located above and between the magnets 41, 42 of the sliding element (as shown in FIG. 6).

In another embodiment of the present invention, the magnet group 5 of the reacting portion 32 is in polar attraction to the magnet 41 of the sliding element 22 adjacent to the first position P1, but in polar opposition to the magnet 42 of sliding element 22 adjacent to the second position P2. When the second sliding apparatus 3 slides the first distance L1, the magnet 41 of the sliding element 22 is attracted by the reacting portion 32 and therefore the sliding element 22 slides to the first position P1, wherein the reacting end 321 is substantially located above a middle of the magnet 41 of the sliding element 22 adjacent to the first position P1. Likewise, when the second sliding apparatus 3 is pushed into the accommodating portion 10, the magnet 42 of the sliding element 22 is repelled by the magnet group 5 of the reacting portion 32, whereby the sliding element 22 lineally slides downwards to the second position P2, wherein the reacting end 321 is substantially located above and between the magnets 41, 42 of the sliding element 22.

Accordingly, the mouse structure 100 of the present invention utilizes magnets disposed on reacting portion 32 and sliding element 22 to produce an invisible magnetic force between the first and second sliding apparatuses 2, 3, and operated with the minor pulling force to enable the first and second sliding apparatuses 2, 3 to mutually affect each other and to slide along the housings 1 of the arc cross section, whereby the second sliding apparatus 3 is capable of sliding automatically the second sliding distance, and the first sliding apparatus 2 is concurrently attracted to lineally slide to the first and second positions P1, P2. The mouse structure 1 of the present invention is not only retractable to reduce the physical size by accommodating the second sliding apparatus 3, but also easy and quick to use by saving more strength to pull or push the second sliding apparatus 3.

It is understood that the invention may be embodied in other forms within the scope of the claims. Thus the present examples and embodiments are to be considered in all respects as illustrative, and not restrictive, of the invention defined by the claims.

What is claimed is:

1. A retractable mouse structure, comprising:
   a housing having an accommodating portion formed therein, an opening defined on one end of the housing and communicating with the accommodating portion, and a bottom base disposed at a bottom of the housing opposite to the opening;
   a first sliding apparatus disposed in the accommodating portion, and comprising a base board and a sliding element, the base board fixedly disposed in the accommodating portion, and the sliding element being slidably mounted on the base board and movable between a first position and a second position; and
   a second sliding apparatus being slidably disposed in the accommodating portion, and comprising a main body and a reacting portion connecting the main body, the main body being capable of sliding in and out of the accommodating portion from the opening, and a reacting end being defined on one end of the reacting portion opposite to the main body;
   wherein when the main body of the second sliding apparatus slides out of the opening, the sliding element of the first sliding apparatus is concurrently and separately pulled by the reacting portion to the first position, and when the main body slides into the accommodating portion, the sliding element is concurrently and separately pushed by the reacting portion to the second position; and
   wherein tracks are protruded from opposite portions of the base board, respectively, and opposite sides of the sliding element respectively bend to form a sliding slot having a U-shape and slidably mounted on the track.

2. The retractable mouse structure of claim 1, wherein the sliding element is provided with a plurality of magnets disposed apart from each other on the sliding element, the reacting portion is provided with a magnet group, and the reacting portion is located apart from and above on the sliding element and the plurality of magnets.

3. The retractable mouse structure of claim 2, wherein the housing has an arc cross section, the second sliding apparatus has an arc cross section corresponding to the arc cross section of the housing, and the base board of the first sliding apparatus is tilted with respect to the bottom base and the opening.

4. The retractable mouse structure of claim 3, wherein the second sliding apparatus slides a sliding distance along a predetermined curve path to reach the first and second positions, and the sliding distance including a first sliding distance and a second distance, the sliding element of the first sliding apparatus slides lineally on the base board.

5. The retractable mouse structure of claim 4, wherein the magnet group of the reacting portion is in polar attraction to the plurality of magnets of the sliding element, and when sliding over the first sliding distance, the main body is capable of sliding downwards automatically the second sliding distance along the predetermined curve path, and the sliding element is concurrently and separately pulled by the magnetic force of the magnet group of the reacting portion to the first position, while the main body slides into the accommodating portion of the housing, the sliding element slides downwards to the second position, and the reacting portion is concurrently and separately attracted by the magnetic force of the plurality of magnets of the sliding element.

6. The retractable mouse structure of claim 4, wherein the magnet group of the reacting portion is in polar attraction to the magnet of the sliding element adjacent to the first position, but in polar opposition to the magnet of the sliding element adjacent to the second position.

7. The retractable mouse structure of claim 2, wherein when the sliding element slides to the first position, the reacting end of the reacting portion is located above a middle of the magnet of the sliding element adjacent to the first position, while the sliding element slides to the second position, the reacting end is located above and between the magnets of the sliding element.

8. The retractable mouse structure of claim 2, wherein the magnet group of the reacting portion includes multiple magnets, which are overlapped.

9. The retractable mouse structure of claim 1, wherein a pulling portion is formed on one end of the main body of the second sliding apparatus opposite to the reacting portion and exposed to the opening of the housing.

10. A retractable mouse structure, comprising:
a housing having an accommodating portion formed therein, an opening defined on one end of the housing and communicating with the accommodating portion, and a bottom base disposed at a bottom of the housing opposite to the opening;
a first sliding apparatus disposed in the accommodating portion, and comprising a base board and a sliding element, the base board fixedly disposed in the accommodating portion, and the sliding element being slidably mounted on the base board and movable between a first position and a second position; and
a second sliding apparatus being slidably disposed in the accommodating portion, and comprising a main body and a reacting portion connecting the main body, the main body being capable of sliding in and out of the accommodating portion from the opening, and a reacting end being defined on one end of the reacting portion opposite to the main body;
wherein when the main body of the second sliding apparatus slides out of the opening, the sliding element of the first sliding apparatus is concurrently and separately pulled by the reacting portion to the first position, and when the main body slides into the accommodating portion, the sliding element is concurrently and separately pushed by the reacting portion to the second position; and
wherein the sliding element is provided with a plurality of magnets disposed apart from each other on the sliding element, the reacting portion is provided with a magnet group, and the reacting portion is located apart from and above on the sliding element and the plurality of magnets.

* * * * *